United States Patent [19]

Desent et al.

[11] Patent Number: 5,020,223
[45] Date of Patent: Jun. 4, 1991

[54] SIMPLIFIED BUMP-FEED TYPE CUTTING HEAD ASSEMBLY FOR FLEXIBLE LINE TRIMMERS

[75] Inventors: Nash S. Desent; Imack L. Collins, both of Shreveport, La.

[73] Assignee: White Consolidated Industries, Inc., Cleveland, Ohio

[21] Appl. No.: 430,672

[22] Filed: Nov. 2, 1989

[51] Int. Cl.$^5$ ............................................. A01D 55/18
[52] U.S. Cl. ........................................ 30/276; 30/347
[58] Field of Search .................... 30/276, 347; 56/12.7

[56] References Cited

U.S. PATENT DOCUMENTS

| | | | |
|---|---|---|---|
| 4,151,646 | 5/1979 | Lane | 30/276 |
| 4,161,820 | 7/1979 | Moore | 30/276 |
| 4,167,812 | 9/1979 | Moore | 30/276 |
| 4,183,138 | 1/1980 | Mitchell et al. | 30/276 |
| 4,203,212 | 5/1980 | Proulx | 30/276 |
| 4,236,309 | 12/1980 | Cayou | 30/276 |
| 4,269,372 | 5/1981 | Kwater | 242/129.8 |
| 4,412,382 | 11/1983 | White, III | 30/276 |
| 4,490,910 | 1/1985 | Mattson et al. | 30/276 |
| 4,524,515 | 6/1985 | Oberg | 30/276 |
| 4,633,588 | 1/1987 | Pittinger | 30/347 |
| 4,672,798 | 6/1987 | Ota | 56/12.7 |
| 4,702,005 | 10/1987 | Pittinger, Sr. | 30/276 |
| 4,823,465 | 4/1989 | Collins | 30/276 |

Primary Examiner—Douglas D. Watts
Attorney, Agent, or Firm—Hubbard, Thurman, Tucker & Harris

[57] ABSTRACT

A compact, light weight, structurally simplified bump-feed type cutting head for a flexible line trimmer is formed from only six components—a hollow cylindrical hub having an open lower end; an annular cover member releasably securable over the lower hub end; a threaded arbor press-fitted into the hub to secure it to the trimmer drive shaft for rotation therewith; a hollow tubular release button member slidably extended through the central cover member opening and axially movable between downwardly extended and upwardly retracted positions; a line storage spool rotatable carried by the release button member within the hub; and a cylindrically coiled compression spring captively retained within the release button and biasing it toward its downwardly extended position. During high speed rotation of the hub about its axis, an outer end portion of flexible line coiled on the spool and passing outwardly through a hub side aperture is whirled through a transverse cutting plane to trim adjacent vegetation. When the outer line end becomes worn away, incremental line feedout is achieved simply by tapping the release button on the ground to activate a line escapement structure defined by cooperating teeth formed on the release button and the inner side surface of the spool hub. Spool removal is achieved simply by removing the cover member, the arbor functioning to hold the release button in place on the hub during and after spool removal.

21 Claims, 2 Drawing Sheets

U.S. Patent  June 4, 1991  Sheet 2 of 2  5,020,223 even with patience and mechanical aptitude, a fairly high degree of manual dexterity on the part of the user is also often required to reassemble a conventional bump-feed type cutting head assembly since various of its internal parts must be held in alignment while the housing cover is reattached to the main housing body against the force of the release button biasing spring.

SIMPLIFIED BUMP-FEED TYPE CUTTING HEAD ASSEMBLY FOR FLEXIBLE LINE TRIMMERS

BACKGROUND OF THE INVENTION

The present invention relates generally to flexible line trimmer apparatus and, in a preferred embodiment thereof, more particularly provides a simplified, low cost and light weight line trimmer cutting head assembly for containing a supply of flexible cutting line and feeding the line out, in controlled increments, when a depending release button portion of the head assembly is tapped against the ground by the trimmer operator.

"Bump-feed" type cutting head assemblies are now commonly used components of flexible line trimmers and typically comprise a rotationally driven housing in which a spool member is disposed for holding a coiled quantity of flexible cutting line. An outer end portion of the line is extended outwardly through a line exit aperture formed in the housing side wall. During high speed rotation of the housing the outwardly projecting line portion is whirled through a transverse cutting plane to perform its usual vegetation trimming function.

Projecting downwardly from the housing is a release button. When tapped against the ground by the trimmer operator, the release button activates a line escapement structure within the housing to cause relative rotation between the spool and the housing in a manner paying out a predetermined increment of cutting line to re-lengthen the outer line end portion after it has been worn away during vegetation cutting use of the trimmer.

Many conventional bump-feed cutting head assemblies of this general type are characterized by a relatively high degree of mechanical complexity, and a correspondingly large number of separate parts which are necessary to cooperatively form, for example, the incremental line escapement structure, the associated ground bumping mechanism, the housing structure, the spool and its support means, and the connecting structure for operatively securing the trimmer shaft and its internal drive system to the cutting head housing.

This mechanical complexity carries with it several well known, and heretofore unavoidable, problems, limitations and disadvantages. For example, the relatively high number of parts required increases both the material cost and the overall weight (and thus the inertial mass) of the cutting head, and specially designed cutting head assembly tools are often required.

The purchaser/user of the overall trimmer product must also deal with the mechanical complexity incorporated in its conventionally constructed cutting head assembly when it is time to rewind line on its spool, or replace the original spool with one upon which cutting line has been factory prewound. This task typically requires that a lower housing cover portion, and one or more additional cutting head parts, be removed to gain access to the line spool for removal thereof.

What often occurs, either before, during or after spool removal, is that various parts within the housing simply fall out and must be laboriously repositioned in proper sequence and orientation within the housing as a necessary adjunct to spool replacement. This can be a rather tedious and annoying chore for the trimmer user with low levels of patience and mechanical aptitude. Even with patience and mechanical aptitude, a fairly high degree of manual dexterity on the part of the user is also often required to reassemble a conventional In view of the foregoing, it is an object of the present invention to provide a bump-feed type line trimmer cutting head assembly which eliminates or minimizes the above-mentioned and other problems commonly associated with cutting heads of conventional construction.

SUMMARY OF THE INVENTION

In carrying out principles of the present invention in accordance with a preferred embodiment thereof, a simplified "bump-feed" type cutting head assembly for flexible line trimmers is provided which is formed from only six components. These components comprise:

1. A molded plastic hub having a hollow cylindrical configuration, an upper end wall with a central drive shaft-receiving opening formed therethrough, an annular side wall depending from the upper end wall periphery and having a line exit aperture and two latch openings formed therethrough, and an open lower end;

2. A molded plastic cover member releasably latchable to the bottom of the hub and having an annular bottom wall with an upstanding annular peripheral side wall telescopingly receivable in the open lower end of the hub;

3. A threaded arbor;

4. A coiled cylindrical compression spring;

5. A molded plastic line storage spool having a hollow, open-ended central hub portion; and 6. A molded plastic release button member having a hollow cylindrical configuration, an open upper end, a closed lower end, and an elongated tubular side wall.

Depending from a central portion of the upper hub end wall is an elongated support collar having, at its upper end, a circumferentially spaced series of retention webs projecting radially inwardly from its inner side surface The threaded arbor may be axially press-fitted within the webs to hold the arbor on the hub and position the arbor to be threaded onto the trimmer drive shaft.

The elongated support collar is outwardly circumscribed by a shorter collar depending from the upper hub end wall, and a circumferentially spaced series of radially directed guide ribs extend across the annular space between the two collars. The elongated support collar is slidably and axially received within the release button member, and the guide ribs are received within axial slots formed within the upper end of the release button member, thereby permitting the release button member to be moved axially relative to the hub but not rotationally relative thereto.

The upper end of the spring is received within the elongated support collar and bears against the underside of an enlarged upper longitudinal portion of the arbor. The lower end of the spring is fitted onto the upper end of an axially extending spring support and retention structure formed within the interior of the release button member. The release button is pressed onto an enlarged lower end portion of the threaded arbor which retains the button and allows axial travel of the button, but inhibits removal of the button from the arbor. The release button thus holds the spring in operative position on the hub. However, then release button retention force at the lower end of the arbor is considerably less than the frictional retention force at its upper end where the arbor is press-fitted into the hub. The release button can thus be pulled apart from the hub when desired. The spring the becomes a loose part. Held in this manner on the hub, the release button may be axially moved relative to the hub between a downwardly extended position and an upwardly retracted position, the spring biasing the release button member downwardly toward its extended position.

The line storage spool, and a supply of flexible cutting line operatively wound thereon, are rotatably mounted within the hub with the release button extending downwardly through the spool hub, the shorter hub collar rotatably received in and supporting the spool hub, by means of two diametrically opposed resilient latching tabs projecting upwardly from the cover member the hub, and an outer line end portion extending outwardly through the hub line exit aperture.

With the cover member latched in place within the open lower end of the hub, the release button member projects downwardly through the central cover member opening, the cover member bears against a portion of the release button member to slightly compress the spring and hold the release button member in its normal, downwardly extended operating position, and the hub and cover member cooperate to restrain the spool against appreciable axial movement relative to the balance of the cutting head assembly.

During trimmer operation, the outer cutting line end portion may be re-lengthened, to compensate for wear-shortening thereof, by simply tapping the release button against the ground to cause it to move axially from its extended position to its retracted position and then back to its extended position. In response to this tapping of the release button, cooperating escapement teeth formed on the release button and the interior side surface of the spool permit the centrifugal line payout force on the outer line end portion to incrementally rotate the spool, and then stop it again, to incrementally lengthen the worn away outer line end portion.

Because of the simple construction of the cutting head assembly, spool removal is easily and quickly achieved simply removing the cover member (by depressing its two latching tabs) and the spool-no other assembly parts need to be removed from or can fall out of the opened assembly hub. Also, the significantly simplified construction of the assembly advantageously reduces its weight, material cost, and rotational inertia, provides for a very compact head configuration, and permits the cutting head to be completely disassembled and reassembled by the trimmer user in a very rapid and easy manner.

DETAILED DESCRIPTION

Figure 1:
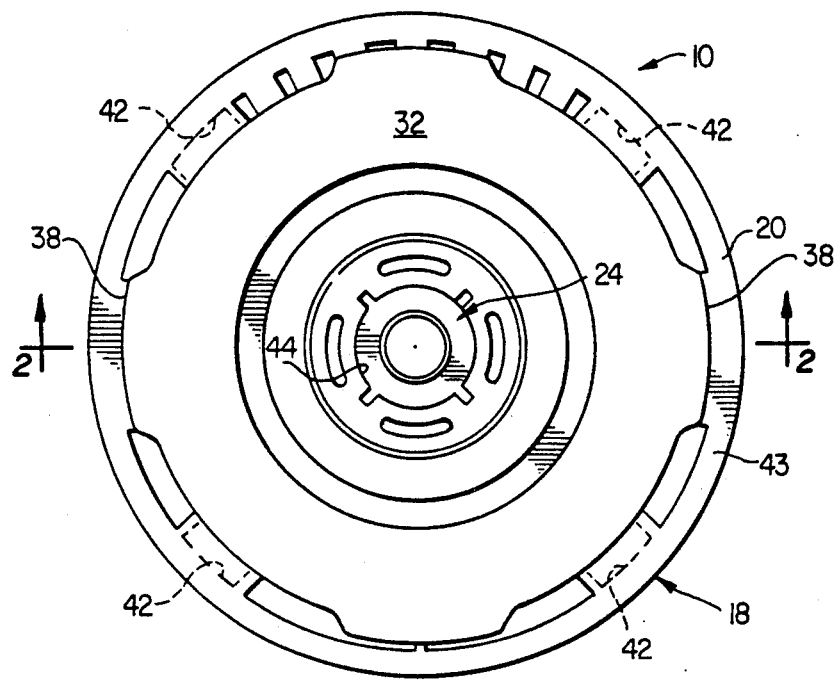
FIG. 1 is a top plan view of a flexible line trimmer cutting head assembly embodying principles of the present invention.
Figure 2:
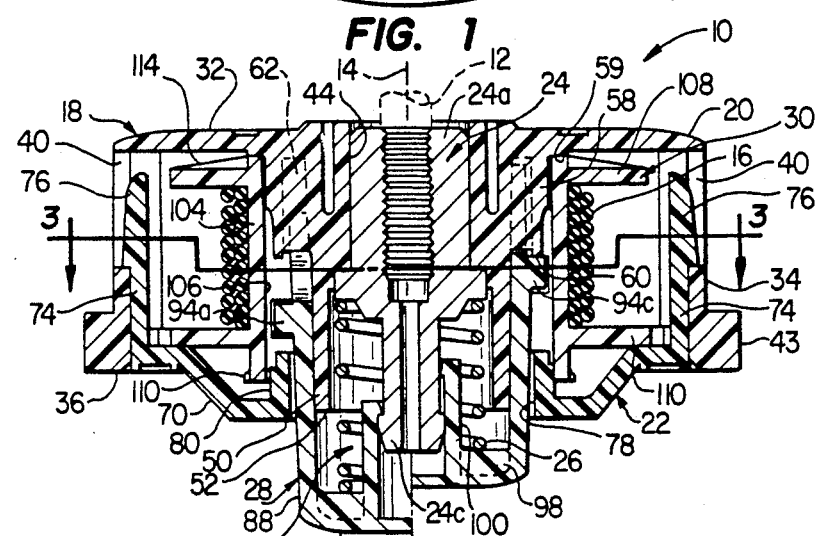
FIG. 2 is a cross-sectional view through the cutting head assembly taken along line 2—2 of FIG. 1, the left side of the assembly being illustrated with a bump-feed line release buttton portion thereof in its downwardly extended position, and the right side of the assembly being illustrated with the line release button in its upwardly retracted position.
Figure 3:
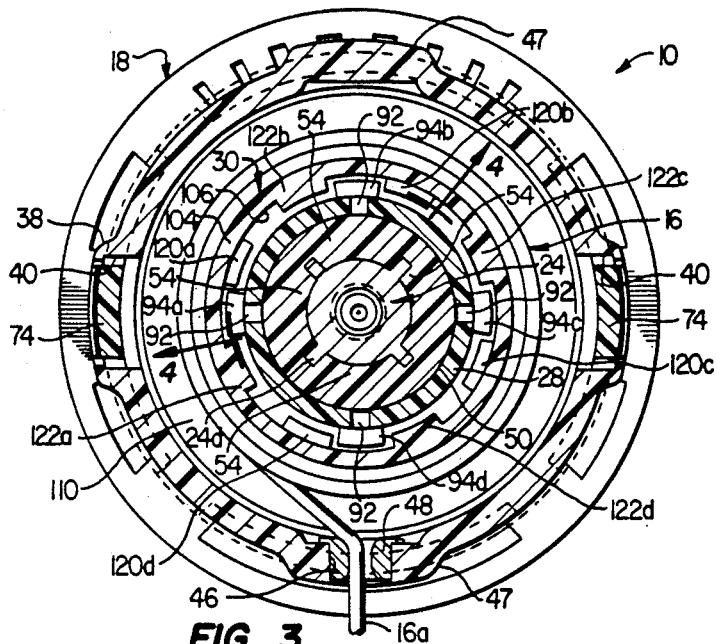
FIG. 3 is a cross-sectional view through the cutting head assembly taken along line 3—3 of FIG. 2, with the entire line release button being illustrated in its downwardly extended position for illustrative clarity.

As illustrated in FIGS. 1-3, the present invention provides a light weight bump-feed type cutting head assembly 10, for use on a flexible line trimmer, which is of a uniquely simple and inexpensive construction, and may be easily and rapidly assembled and disassembled by the trimmer user without the use of tools of any sort. In a manner subsequently described, the assembly 10 is threadingly secured to an end of the drive shaft 12 (FIG. 2) of a flexible line trimmer (not illustrated) and is rotationally drivable at a high speed about a central drive axis 14.

High speed rotation of the assembly 10 rapidly swings an outwardly projecting end portion $16_a$ of flexible cutting line 16 stored within the assembly 10 through a cutting plane transverse to axis 14 to perform the usual vegetation cutting function of the trimmer. As the whirling line portion $16_a$ becomes wear-shortened during trimmer operation, the assembly 10 (as later described) may be simply tapped downwardly against the ground by the trimmer operator to incrementally feed out additional cutting line and re-lengthen the operative line portion $16_a$.

Figure 5:
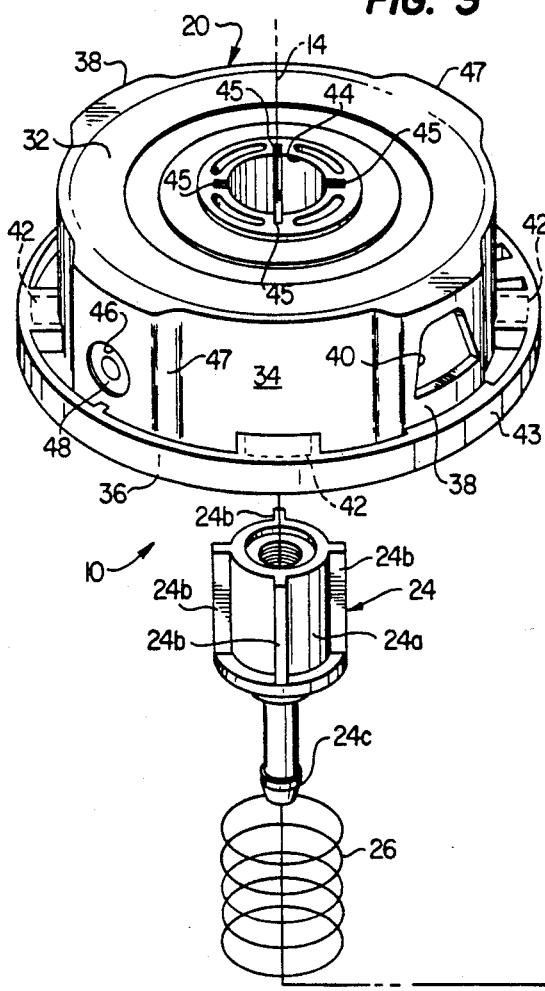
FIG. 5 is an exploded perspective view of the cutting head assembly.
Figure 5:
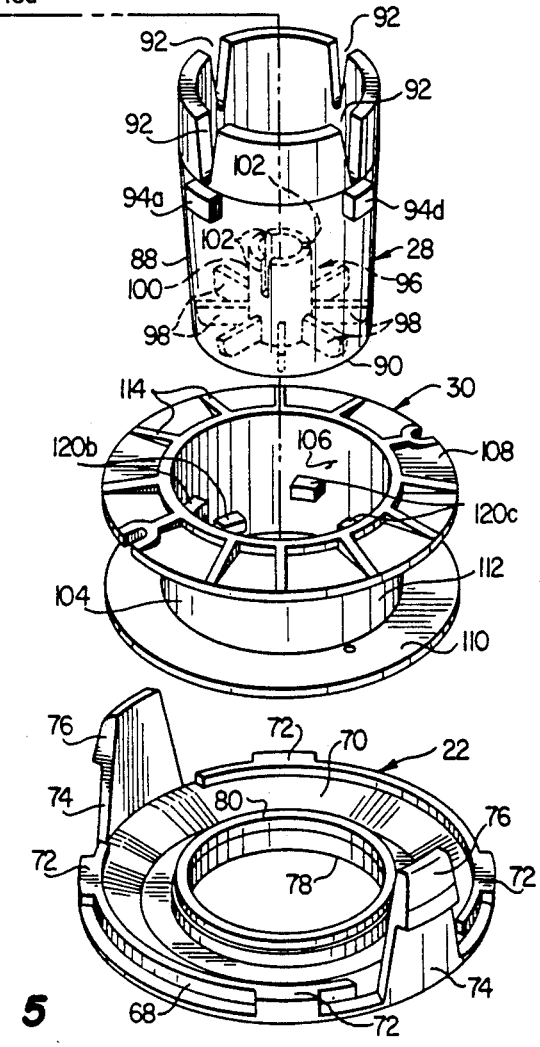

The mechanical simplicity of the cutting head assembly 10 is best illustrated in FIG. 5 wherein it may be seen that the entire assembly consists of only six components—a housing 18 defined by an upper hub portion 20 and a lower cover member 22, a threaded arbor 24, a coiled cylindrical compression spring 26, a line release button member 28, and a line storage spool 30.

The hub 20 is of a molded plastic construction and has a hollow, generally cylindrical configuration, an upper end wall 32, a generally annular side wall 34, and an open lower end 36. For purposes later described, two radially thickened circumferential portions 38 of side wall 34 are provided with a latching openings 40, four locating recesses 42 are formed in the underside of a hub bottom flange 43 in a circumferentially spaced relationship with the latching openings 40, and a circular opening 44, having four radially outwardly projecting slot portions 45, is formed axially through the upper end wall 32. At 90° from the latching openings 40, a line exit opening 46 (FIGS. 3 and 5)is formed radially through one of two radially enlarged portions 47 of the hub side wall 34, the line exit opening being fitted in the usual manner with a metal line guard eyelet or grommet 48.

As best illustrated in FIGS. 2 and 3, an elongated annular support collar 50 extends axially downwardly from a central portion of the underside of the upper hub end wall 32 and has an open lower end 52 positioned somewhat below the open lower end 36 side surface of the support collar 50, along an upper end portion thereof, are four circumferentially spaced webs 54 between which the slots 45 downwardly extend.

Also extending downwardly from the interior side surface of the upper hub end wall 32 is a cylindrical collar 58 which is shorter than and outwardly circumscribes the central collar 50. The collar 58 has an open lower end 60 which is positioned at a generally central axial location within the hub 20. For purposes later described, four circumferentially spaced, radially extending ribs 62 extend across the annular space between the collars 50 and 58. The upper end of the collar 58 is circumscribed by an annular raised pad 59.

Referring now to FIGS. 2 and 5, the bottom cover member 22 is of a molded plastic construction and has an annular side wall 68 which extends upwardly from the periphery of an annular lower end wall 70 that slopes upwardly and radially outward. The side wall 68 is radially dimensioned to be axially received within the open lower end 36 of the hub 20, and has formed around its periphery four circumferentially spaced, radially outwardly projecting locating lugs 72, configured to be received in the hub locating recesses 42, and two axially upwardly projecting, radially inwardly deformable latching tabs 74 having enlarged upper end portions 76 adapted to be releasably snapped into the latching openings 40 in the hub side wall 34 in a manner subsequently described. The lower end wall 70 of the cover member 22 is provided with a central circular opening 78 which is bordered, along the upper side surface of the lower end wall 70, by an upstanding annular collar 80.

To rapidly install the cover member 22 within the lower end of the hub 20, the cover member is pushed upwardly into the lower end opening 36 of the hub to its axial position shown in FIG. 2 to cause the locating lugs 72 to enter the locating slots 42, and cause the latching tabs 74 to pop outwardly into the latching openings 40, thereby releasably locking the cover member remove the cover member 22 from the hub 20, the cover member latching tabs 74 are simply pushed inwardly to permit axial travel of the cover member to disengage the latching tabs from their associated hub openings and permit axial removal of the cover member from the hub as illustrated in FIG. 5.

The release button member 28 is of a molded plastic construction and has a tubular side wall 88 which is closed at its lower end by a bottom end wall 90. Formed downwardly through an upper end portion of the side wall 88 are four circumferentially spaced, axially extending slots 92 which terminate at their lower ends at four rectangularly cross-sectioned tooth members $94_a$, $94_b$, $94_c$ and $94_d$ projecting radially outwardly from the release button side wall 88. The exterior diameter of the release button side wall 88 below these teeth is sized to be downwardly and slidably received within the central opening 78 of the lower end wall 70 of the cover member 22, and the inner diameter of the release button side wall is sized to slidably receive the central support collar 50 of the hub 20.

Extending upwardly from a central portion of the release button end wall 90 is a spring support structure 96 defined by eight circumferentially spaced rib members 98 extending radially outwardly from the bottom end of a hollow cylindrical post member 100 having three circumferentially spaced slots 102 formed in its upper end.

The spool 30 is of a molded plastic construction and has a hollow, open-ended cylindrical hub portion 104 with an interior side surface 106. Positioned axially inwardly of the upper and lower ends of the hub 104, and projecting radially outwardly therefrom, are annular upper and lower spool flanges 108 and 110 which define with the hub 104 a cutting line storage cavity 112 within which the flexible cutting line 16 may operatively wound as best illustrated in FIG. 2. A circumferentially spaced series of radially extending stiffening ribs 114 are formed on the outer side surface of the spool flange 108 as illustrated in FIGS. 2 and 5. As illustrated in FIG. 2, a lower end portion of the spool hub 104 is provided with a radially outwardly projecting annular lip 110 which allows easy gripping when removing and installing the spool on the hub.

Figure 4:
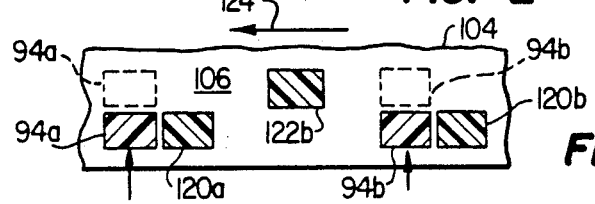
FIGS. 4, 4A and 4B are schematic, straightened partial cross-sectional views taken through the cutting head assembly along the curved section line 4—4 of FIG. 3, and sequentially illustrate the cooperation between interior line spool and exterior release button teeth during incremental cutting line payout from the cutting head assembly.

Referring now to FIGS. 2-4, two circumferentially spaced series of radially inwardly directed, rectangularly crosssectioned teeth $120_a$–$120_d$ and $122_a$–$122_d$ are formed on the interior side surface 106 of the spool hub 104. As will be subsequently described, these eight interior spool teeth cooperate with the four release button teeth $94_a$–$94_d$ to form an escapement mechanism which, in response to tapping the release button 28 against the ground during trimmer operation, creates an incremental payout of cutting line 16 through line exit opening 46 to relengthen the operative outer line end portion $16_a$. The lower spool teeth $120_a$–$120_d$ are axially positioned adjacent the bottom end of the spool hub 104 and are downwardly and circumferentially offset from the upper spool teeth $122_a$–$122_d$.

To assemble the cutting head assembly 10 from its fully disassembled state illustrated in FIG. 5, an enlarged upper end portion $24_a$ of the threaded arbor 24 is press-fitted upwardly into the hub opening 44, as illustrated in FIG. 2, so that radially projecting ribs $24_b$ on the arbor portion $24_a$ enter the over the upper end 100 of the spring support post 100 within the interior of the release button member 28, so that the spring 26 abuts the ribs 98 within the release button 28.

The release button 28 is then pushed upwardly onto the central hub collar 50 to cause entry of the hub ribs 62 into the axial slots 92 in the release button 28. The release button is then firmly pushed in an upward direction to compress the spring 26 and drive its cylindrical post 100 over a radially enlarged lower end portion $24_c$ of arbor 24, thereby frictionally intersecuring the release button to the arbor and causing the spring 26 to be captively retained within the release button, with the upper and lower spring ends respectively engaging the bottom of the arbor portion $24_a$ and the release button ribs 98. The release button is then released to permit the spring 26 to return to its almost uncompressed state. The frictional engagement between the lower arbor end and the inner side surface of the release button releasably holds the button member 28 on the hub collar 50, and the hub ribs 62 prevent relative rotation between the release button 28 and the hub 20 about the drive axis 14. However, the release button slots 92 permit the release button 28 to be axially moved relative to hub 20 between the downwardly extended release button member position shown on the left side of FIG. 2 and its upwardly retracted position shown on the right side of FIG. 2.

The interengagement between the arbor 24 and the inner side surface of the release button, while sufficient to hold the release button on the hub collar 50 before the bottom cover than the frictional engagement between the arbor and the hub. Accordingly, when it is desired to remove the release button from the hub collar 50, the release button is simply pulled downwardly to disengage release button from the arbor, the removed release button permitting the spring to be loose.

After the release button 28 is operatively positioned on the hub collar 50 and frictionally retained thereon, the release button is inserted downwardly into the interior of the spool hub 104, and the line end portion $16_a$ is threaded outwardly through the line exit opening 46 in the hub 20. The spool 30, with its teeth $94_a$–$94_d$ circumferentially positioned between the spool teeth sets $120_a$–$12_d$ and $122_a$–$122_d$ as illustrated in FIG. 3, is then pushed upwardly into the interior of hub 20 so that the hub collar 58 is slidably received within the interior of the spool hub 104. Finally, the bottom end of the release button is inserted into the central opening 78 of the cover member 22, the cover member side wall 68 is pushed into the interior of the hub 20, and the cover member is pushed into the hub to lock the cover member in place as previously described. The installation of the cover member 22 pushes the release button 28 upwardly to its extended operating position and slightly compresses the spring 26.

With the cover member 22 releasably latched in place in this manner, the installed spool 30 is restrained against appreciable axial movement relative to the housing 18 by the slidable axial engagement between the hub abutment ribs 64 and the upper end of the spool hub 104, the slidable axial engagement between the lower end 60 of the hub collar 58 and the upper spool teeth $122_a$–$122_d$, and the slidable axial engagement of the annular cover member collar 80 and the cover member ribs 82 with the lower spool teeth $120_a$–$120_d$ and the lower end of the spool hub 104 as best illustrated in FIG. 2. With the cover member 22 in its installed position illustrated in FIG. 2, the engagement between compresses the spring 26, brings the release button teeth $94_a$–$94_d$ into vertical alignment with the lower interior spool teeth $120_a$–$120_d$.

The assembled cutting head 10 may be screwed directly onto the bottom end of the drive shaft 12 as illustrated in FIG. 2, the drive shaft 12 extending downwardly into the upper hub opening 44 and being threadingly received within the press-fitted retaining arbor 24. High speed rotation of the cutting head portion $16_a$ a centrifugal line payout force which exerts a counterclockwise rotational force on the spool 30 as indicated by the arrow 124 in FIG. 3. However, with the release button member 28 in its downwardly extended operatively position as shown on the side of FIG. 2, counterclockwise rotation of the spool is prevented by the respective engagement of the release button teeth $94_a$–$94_d$ with the lower interior spool teeth $120_a$–$120_d$. The spool rotation-preventing abutment between the representative release button teeth $94_a$ and $94_b$ with the lower interior spool teeth $120_a$ and $120_b$ is schematically illustrated in FIG. 4.

During operation of the line trimmer, when the outer line end portion $16_a$ becomes wear-shortened, the trimmer operator simply taps the lower end of the release button member 28 against the ground to move the release button upwardly to its retracted position. Upward movement of the release button to its retracted position shifts the release button teeth $94_a$–$94_d$ upwardly out of abutting engagement with the lower interior spool teeth $120_a$–$120_d$. This upward shift of the release button teeth is shown in FIG. 4 in which, during the downward portion of the release button ground tap, the representative release button teeth $94_a$ and $94_b$ are shifted upwardly to the dashed line positions thereof.

Figure 4A:
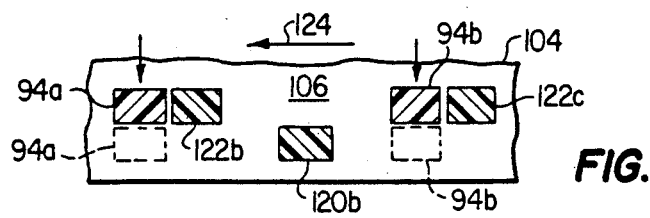

Disengagement of the release button teeth from the lower interior spool teeth permits the centrifugal line payout force in the outer line end portion $16_a$ to rotate the spool 30 in a counterclockwise direction until, as illustrated in FIG. 4A, the upper interior spool teeth $122_b$ and $122_c$ are brought into abutment with and stopped by the now upwardly shifted release button 1 teeth $94_a$ and $94_b$. At this point, of course, the other two release button teeth are also engaged by and stop the other two upper interior spool teeth.

Figure 4B:
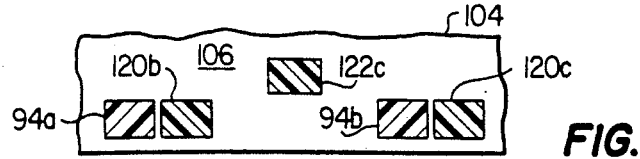

When the release button is lifted from the ground, the spring 26 downwardly returns the release button to its extended position as representatively indicated by the dashed line positions of the release button teeth $94_a$ and $94_b$ in FIG. 4A. This downward shifting of the release button teeth permits the centrifugal line payout force in the outer line end portion $16_a$ to once again cause counterclockwise rotation of the spool 30 until the lower interior spool teeth $120_b$ and $120_c$ are brought into abutment with and are stopped by the now downwardly shifted release button teeth $94_a$ and $94_b$ as illustrated in FIG. 4B.

Thus, in response to a single tap and release of the button member 28, two discrete increments of cutting line are centrifugally payed out through the line exit opening 46, the total line payout increment resulting from a quarter turn of the spool 30 in a counterclockwise direction as viewed in FIG. 3. Additional quarter spool turn line payout increments may be selectively achieved simply by tapping the release button on the ground an appropriate number of additional times.

To replace the spool 30, or to refill it with flexible cutting line, all that is necessary is to radially inwardly depress the cover member tabs 74, axially remove the cover member from hub 20, and slide the spool downwardly off the release button member 28 which remains frictionally secured to the hub 20 as previously described. Simply stated, no other parts need to be removed from the cutting head assembly, and no other parts are free to fall off the hub 20 when the cover member is removed. The balance of the assembly remains in a fully assembled and operative state. All that is necessary to ready the assembly for subsequent trimming use is to reinstall the cover member and a line-filled spool.

Compared to the relatively complex, multi-piece constructions of conventional bump-feed type cutting head assemblies, the cutting head 10 of the present invention advantageously provides a significantly simplified construction which is much easier for the typical trimmer user to handle when it becomes necessary to replace a depleted supply of cutting line. No tools of any sort are required for even complete disassembly and reassembly of the cutting head.

This simplicity, of course, also provides a variety of operational and manufacturing advantages. For example, because there are only six components in the assembly 10 its overall material cost and weight is significantly reduced, thereby permitting its manufacturing cost to be correspondingly diminished. Also, due to this weight reduction the rotational inertia of the cutting head is desirably reduced so that, for a given rotational velocity of the head, less driving power is required. This rotational inertia reduction is further enhanced by the fact that the lower cover member is received within the upper hub and does not increase the overall diameter of the assembly.

The mechanical simplicity of the cutting head assembly 10 also reduces its initial fabrication cost since there are only six components which may be rapidly put together at the factory without (except for the installation of the line guard eyelet and the press-fitting of the threaded arbor into the hub) the use of special tools of any sort.

The foregoing detailed description is to be clearly understood as being given by way of illustration and example only, the spirit and scope of the present invention being limited solely by the appended claims.

What is claimed is:

1. A cutting head assembly for a flexible line trimmer, comprising:

housing means rotationally drivable about an axis extending therethrough, said housing means having a side wall portion circumscribing said axis and having an aperture formed therethrough;

spool means for holding a length of flexible cutting line having a free end portion, said spool means:

being rotatably mounted within said housing means and restrained therein against appreciable axial reciprocation relative thereto, being positioned within said housing means to permit the free cutting line end portion to extend outwardly through said aperture into a cutting plane transverse to said axis, and exert a centrifugal line payout rotational force on said spool means, when said housing means are rotated at high speed, and having a hollow hub portion with an interior side surface which coaxially circumscribes said axis;

ground bumping means protruding axially downwardly from said housing means and being axially movable relative thereto between an extended position and a retracted position;

spring means for biasing said ground bumping means toward said extended position thereof, whereby said ground bumping means may be tapped against the ground to cause said ground bumping means to be sequentially moved from said extended position to said retracted position against the biasing force of said spring means, and then returned to said extended position by said spring means; and cooperatively interengageable tooth means, formed on said ground bumping means and said interior side surface of said hollow hub portion of said spool means and projecting therefrom in a direction generally transverse to said axis, for preventing rotation of said spool means relative to said housing means, during operative rotation of said housing means, until said ground bumping means are tapped against the ground or another solid object, and then permitting an incremental rotation of said spool means to pay out a corresponding length of cutting line therefrom in response to movement of said ground bumping means from said extended position to said retracted position and then back to said extended position thereof.

2. The cutting head assembly of claim 1 wherein said cooperatively interengageable tooth means comprise:

a first annular, circumferentially spaced series of radially outwardly projecting tooth members formed on said ground bumping means and circumscribing said axis, a second annular, circumferentially spaced series of radially inwardly projecting tooth members formed on the interior side surface of said hub portion of said spool means circumscribing said axis, and a third annular, circumferentially spaced series of radially inwardly projecting tooth members formed on the interior side surface of said hub portion of said spool means and circumscribing said axis, said second and third series of tooth members being axially and circumferentially offset from one another.

3. The cutting head assembly of claim 1 wherein said housing means include:

a hub portion having an annular side wall through which said aperture is formed, said hub portion side wall further having a latching opening formed therethrough, and an open lower end, and a bottom cover member having a bottom wall extending across said lower end of said hub portion and having a central opening through which said ground bumping means downwardly extend, and an annular side wall telescopingly received within said hub portion side wall and having a resiliently deformable latching tab lockingly received within said latching opening.

4. The cutting head assembly of claim 1 wherein:

said housing means have a hub portion to which a bottom cover member with a central opening through which said ground bumping means extend, said spool means hub portion coaxially circumscribes said ground bumping means and is axially removable therefrom when said bottom cover member is removed from the balance of said housing means, said spring means are positioned within said ground bumping means, and said ground bumping means are removably retained on said housing means hub portion in a manner releasably holding said ground bumping means on said housing means hub portion when said bottom cover member and said spool means are removed therefrom.

5. The cutting head assembly of claim 1 wherein:

the flexible line trimmer has a drive shaft with a threaded cutting head connection end portion, said housing means have an upper end wall with a central opening formed therethrough into which said end portion of the drive shaft may be inserted, and said cutting head assembly further comprises a threaded arbor captively and nonrotatably held within said housing means beneath and aligned with said central opening in said upper housing means end wall, whereby the assembled cutting head assembly may be operatively secured to the drive shaft by extending the cutting head connection end portion of the drive shaft into the central upper end wall opening and threading it into said threaded arbor by rotating said cutting head assembly.

6. The cutting head assembly of claim 5 wherein:

said housing means have a removable bottom cover member with a central opening through which said ground bumping means extend, and said ground bumping means are releasably secured to said threaded arbor and are retained thereon when said bottom cover member is removed from said housing means.

7. A cutting head assembly for a flexible line trimmer, comprising:

a hollow, generally cylindrical housing hub rotationally drivable about a central axis thereof and having an upper end wall, a side wall depending from the periphery of said upper end wall and having an aperture formed therethrough, and an open lower end;

a cover member releasably secured to said housing hub and extending across, said lower end thereof, said cover member having a central opening extending axially therethrough:

a line storage spool rotatably mounted within said housing hub and having a hollow, open-ended hub coaxially circumscribing said axis, said spool being adapted to hold a quantity of cutting line having an outer end portion extendable outwardly through said aperture;

a release button member extending axially upwardly through said central cover member opening into said housing hub through said spool hub, said release button member being axially movable relative to said cover member between a downwardly extended position and an upwardly retracted position;

incremental line feed means for preventing rotation of said spool relative to said housing hub, and then permitting an incremental rotation of said spool relative to said housing hub when said release button member is moved from its extended position to its retracted position and then back to its extended position; and spring means, interconnected between said release button member and said housing hub, for biasing said release button member toward its extended position and for retaining said release button member on said housing hub when said spool and said cover member are removed therefrom.

8. The cutting head assembly of claim 7 wherein:

said housing hub side wall has latch openings formed therethrough, said cover member has an upwardly projecting side wall portion telescopingly received within said housing hub side wall, and said cover member is releasably secured to said housing hub by means of resiliently deformable latch members carried by said cover member side wall portion and lockingly received in said latch openings.

9. A bump-feed type cutting head assembly for a flexible line trimmer having a drive shaft with a cutting head connection end portion, said cutting head assembly comprising:

a housing having:

a generally cylindrical hub extending along a drive axis and having an upper end wall with a central aperture extending axially therethrough and adapted to receive said connection end portion of the line trimmer drive shaft, an annular side wall depending from the periphery of said upper end wall and having a line exit opening formed radially therethrough, an open lower end, and a hollow tubular support collar outwardly circumscribing said upper end wall aperture and extending axially downwardly from said upper end wall, a bottom cover member extending across said lower end of said hub and having an annular bottom wall with a central opening extending axially therethrough, and latch means for releasably holding said cover member on said hub;

a hollow, generally tubular release button member having a cylindrical side wall, an open upper end, and a lower end wall, said release button member coaxially and releasably receiving said tubular support collar and having a lower end portion extending through said central cover member opening and projecting downwardly therefrom;

cooperating means on said housing and said release button member for precluding appreciable rotation of said release button member about said drive axis relative to said housing, but permitting axial movement of said release button member relative to said housing, and through said central cover member opening, between a downwardly extended position and an upwardly retracted position;

a threaded arbor captively and nonrotatably held within an upper end portion of said support collar and positioned to be threaded onto said connection end portion of the trimmer drive shaft to permit said housing to be rotationally driven about said drive axis by the drive shaft, said release button member being captively but releasably retained on said threaded arbor;

spring means, positioned within said release button member and said support collar, for biasing said release button member toward its downwardly extended position;

a line storage spool, disposed within said housing, for holding a length of flexible cutting line having an outer end portion extendable outwardly through said line exit opening, said line storage spool being rotatable relative to said housing about said axis, but restrained by said housing against appreciable axial reciprocation relative thereto, said line storage spool having a hollow, open-ended cylindrical hub portion with an interior side surface that outwardly circumscribes the outer side surface of said side wall of said release button member; and cooperating incremental line feed means, formed on said outer side surface of said release button member and said inner side surface of said spool hub portion, for preventing rotation of said line storage spool relative to said housing when said release button member is in its extended position, but permitting an incremental rotation of said line storage spool relative to said housing when said release button member is sequentially moved from its extended position to its retracted position and back to its extended position.

10. The cutting head assembly of claim 9 further comprising:

a length of flexible cutting line operatively wound on said line storage spool.

11. The cutting head assembly of claim 9 wherein:

the interior side surface of an upper end portion of said support collar has a circumferentially spaced series of radially inwardly directed ribs formed thereon, and said threaded arbor is press-fitted between said ribs.

12. The cutting head assembly of claim 9 wherein:

said release button member has a spring retaining structure therein, and said spring means are received within said release button member and comprise a coiled cylindrical compression spring element having an upper end portion bearing against said threaded arbor, and a lower end portion bearing against said spring retaining structure.

13. The cutting head assembly of claim 12 wherein:

a lower end portion of said threaded arbor is removably secured to said release button member with a retention force less than the frictional retaining force between said threaded arbor and said housing hub, whereby said release button member is retained on said housing hub when said cover member and said spool are removed therefrom, and said release button member may be pulled apart from said threaded arbor without dislodging said threaded arbor from said housing hub.

14. The cutting head assembly of claim 11 wherein:
said release button member has a hollow arbor retaining structure extending axially upwardly from said lower end wall thereof, and
said threaded arbor has a lower end portion captively but removably retained within said hollow arbor retaining structure.

15. The cutting head assembly of claim 9 wherein:
said bottom cover member has an annular side wall extending upwardly from the periphery of its bottom wall and telescopingly received within said side wall of said housing hub.

16. The cutting head assembly of claim 15 wherein said latch means include:
at least one latching aperture formed through said side wall of said housing hub, and
at least one resiliently deformable latching tab member carried by said side wall of said cover member and lockingly received within said at least one latching aperture.

17. The cutting head assembly of claim 9 wherein said cooperating means on said housing and said release button member include:
a circumferentially spaced series of axial slots extending inwardly through the upper end of said side wall of said release button member, and
a circumferentially spaced series of ribs extending radially outwardly from an upper end portion of said support collar and slidably received in said slots.

18. The cutting head assembly of claim 17 further comprising:
a second annular collar depending from said upper end wall of said housing hub and outwardly circumscribing an upper end portion of said support collar, said second annular collar being coaxially and slidably received in an upper end portion of said spool hub.

19. The cutting head assembly of claim 9 wherein said cooperating incremental line feed means comprise:
an annular, circumferentially spaced series of radially outwardly directed tooth members formed on the outer side surface of said side wall of said release button member and circumscribing said drive axis,
a first annular, circumferentially spaced series of radially inwardly directed tooth members formed on the interior side surface of said line storage spool and circumscribing said drive axis, and
a second annular, circumferentially spaced series of radially inwardly directed tooth members formed on the interior side surface of said line storage spool and circumscribing said drive axis,
said first and second series of tooth series being axially and circumferentially offset from one another.

20. Apparatus for holding flexible cutting line within a rotatable cutting head assembly of a flexible line trimmer, said apparatus comprising:
a line storage spool member having:
a hollow, open-ended cylindrical hub having an interior side surface,
first and second axially spaced flanges secured to and extending radially outwardly from opposite end portions of said hub and defining therewith an annular line storage cavity,
a first circumferentially spaced annular series of radially inwardly directed tooth members formed on said interior side surface of said hub, and
a second circumferentially spaced annular series of radially inwardly directed tooth members formed on said interior side surface of said hub, said first and second series of tooth members being circumferentially and axially offset from one another.

21. The apparatus of claim 20 further comprising:
a length of flexible cutting line operatively wound within said annular line storage cavity of said line storage spool member.

* * * * *

UNITED STATES PATENT AND TRADEMARK OFFICE
CERTIFICATE OF CORRECTION

PATENT NO. : 5,020,223

DATED : June 4, 1991

INVENTOR(S) : Nash S. Desent and Imack L. Collins

It is certified that error appears in the above-identified patent and that said Letters Patent is hereby corrected as shown below:

Col. 2, line 41, insert --.-- after "surface".

Col. 3, line 17, insert --periphery and lockingly received in corresponding latch openings in-- after the first word "-ber".

Col. 3, line 43, insert --by-- after "simply".

Col. 3, line 61, "buttton" should be --button--.

Col. 4, line 61, insert --of the hub 20. Extending radially inwardly from the interior-- after "36".

Col. 5, line 31, insert --22 to the hub 20 over its open lower end. When it is desired to-- after "cover member".

Col. 5, line 67, insert --be-- after "may".

Col. 6, line 28, insert --slots 45 (Fig. 5). The lower end of the spring 26 is then fitted-- after "enter the".

Col. 6, line 59, insert --member is attached to the housing hub, is considerably weaker-- after "bottom cover".

Col. 7, line 28, insert --the cover member and the release button teeth, which slightly-- after "the engagement between".

Col. 7, line 37, insert --assembly 10 by the drive shaft 12 creates in the outer line end-- after "cutting head".

UNITED STATES PATENT AND TRADEMARK OFFICE
CERTIFICATE OF CORRECTION

PATENT NO. : 5,020,223

DATED : June 4, 1991

INVENTOR(S) : Nash S. Desent and Imack L. Collins

It is certified that error appears in the above-identified patent and that said Letters Patent is hereby corrected as shown below:

Col. 7, line 42, insert --left-- after "as shown on the".

Col. 8, line 1, delete [1] after "button".

Col. 11, line 4, "across," should be --across--.

Signed and Sealed this

Thirtieth Day of March, 1993

*Attest:*

STEPHEN G. KUNIN

*Attesting Officer*   *Acting Commissioner of Patents and Trademarks*